Aug. 4, 1931.  H. F. GODEL  1,816,899
ADVERTISING DEVICE
Filed April 4, 1929

H. F. GODEL.
Inventor
By Goldberg.
Attorney

Patented Aug. 4, 1931

1,816,899

UNITED STATES PATENT OFFICE

HOWARD F. GODEL, OF PORTLAND, OREGON

ADVERTISING DEVICE

Application filed April 4, 1929. Serial No. 352,347.

My invention relates to advertising devices in which a projector, and an automatically operated, endless film are enclosed in a box; and in which a translucent screen constitutes the front wall of the box.

The objects of my invention are to provide an advertising device which is simple to construct; which will give a great number of pictures or advertisements or both; which will operate automatically; which can be attached to any light socket; which can be used in any show window, hotel lobby, waiting room, bank, store, or any other place of public assembly; and which will surely attract the attention of any passer-by.

Other objects and advantages are to be found in the construction and arrangements of parts as will be described in the specification and particularly pointed out in the appended claims.

Figure 2:
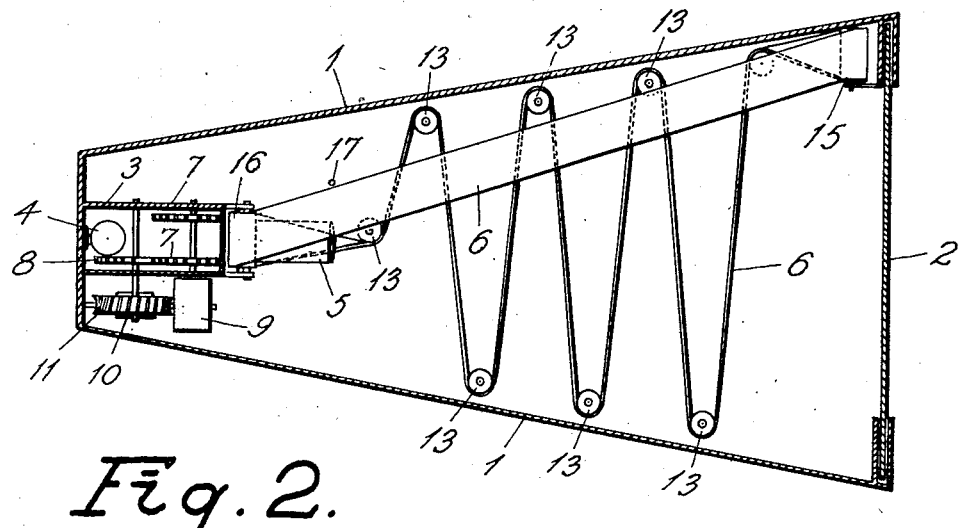
Figure 3:
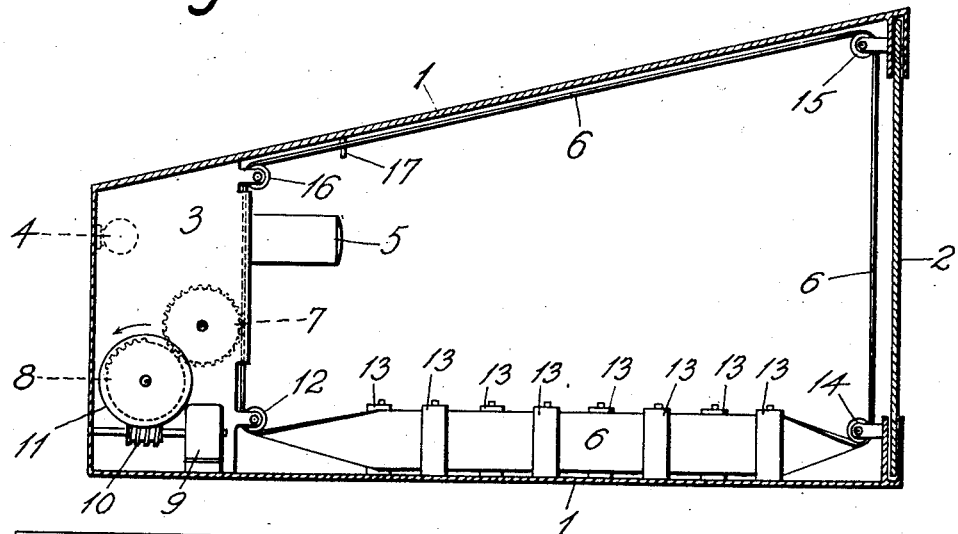
Figure 1:
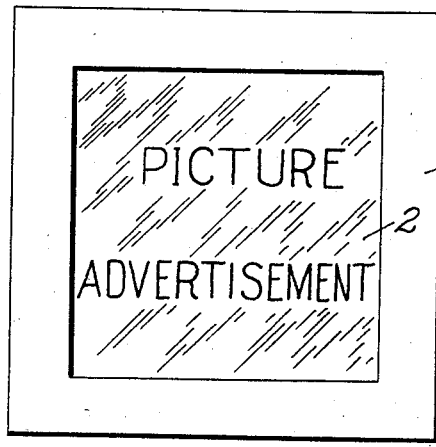

I attain these objects with the mechanism illustrated in the accompanying drawings, in which:

Fig. 1 is a front view of my advertising device.
Fig. 2 is a plan view with the top removed.
Fig. 3 is an elevation with the side wall removed.

Similar numerals refer to similar parts throughout the several views.

The box 1 is preferably enlarged toward the front end and narrowed down toward the rear end. A translucent screen 2 constitutes the front wall of the box 1. Within the box 1 and at the rear end thereof is a projector comprising a housing 3, a light globe 4, and a lens 5. An endless film 6 passes in the conventional manner through the housing 3 between the light globe 4 and the lens 5. Mounted in the housing 3 are two film gears which engage the film 6 with their teeth. Also mounted in the housing 3 is a mutilated gear 8 which engages the film gear 7 intermittently.

Outside the housing 3, but still within the box 1 is a small motor 9 with worm 10 and worm wheel 11 which drive the mutilated gear 8. The ratio of the teeth on the mutilated gear 8 to the teeth on the film gear 7 is such that a new picture will be produced with each revolution of the mutilated gear 8, said picture then remaining exposed to view until the mutilated gear 8 has completed another revolution.

Each portion of the film 6 travels past the lens 5, then underneath the horizontal roller 12, and making a half turn at the bottom of the box 1 proceeds in zig-zag formation across the width of the box 1, around the upright rollers 13 toward one of the front corners, where, again making a half turn, said film 6 proceeds below the horizontal roller 14 upwardly and parallel to the front wall of the box 1 to the horizontal roller 15 on top. After passing said roller 15, said film 6 proceeds parallel to the top of the box 1 to the horizontal roller 16 at the rear of the box 1 and then again past the lens 5.

Since the front wall of the box 1 is approximately twelve inches square and the length is four feet more or less, the deviation of the top run of the film 6 will be considerably less than is shown in the drawings and can therefore easily be cured, either by a suitable alinement of the top rollers 15 and 16 or in any other manner, as for instance by a guiding pin 17. It is clear that by the zig-zag alinement of the film on the bottom of the box a very long strip of film can be accommodated in said box, and a great number of pictures can be shown, providing thus a long continued and fascinating spectacle for passers-by.

Having thus described my invention, it will be seen that my objects have been accomplished and though I have shown the preferred form of construction, I reserve to myself the right to make minor changes.

I claim:

1. In an advertising device, the combination of a box, a translucent screen in the front wall of the box, a projector at the rear wall within the box, and an endless strip of films passing through the projector from the top toward the bottom, said endless strip of film making a half turn at the bottom of the box and then proceeding in zig-zag formation and in vertical alinement along the bottom of the box, making a half turn near a front corner of the box, then proceeding along the front wall of said box and parallel to the screen toward the top, and thence proceeding parallel to the top toward the projector, and then entering the projector.

2. In an advertising device, the combination of a box, a translucent screen in the front wall of the box, a projector at the rear wall within the box, and an endless strip of film passing through the projector from the top toward the bottom, said endless strip of film proceeding in a vertical plane and zig-zag formation across the width of the box and along the bottom of said box toward one front corner, and then proceeding parallel to the front wall of the box, and then parallel to the top wall of the box toward the projector and into said projector.

3. In an advertising device, the combination of a box, a translucent screen in the front wall of the box, a projector at the rear wall within the box, and an endless strip of films passing through the projector, a horizontal roller below the projector, a plurality of upright rollers disposed in zig-zag formation along the bottom of the box, a horizontal roller in one front corner of the box and at the bottom thereof, a horizontal roller in one top corner of the box above the bottom roller, and one horizontal roller above the projector, all said rollers guiding the strip of films in front of the projector without interfering with the screening of the films.

4. In an advertising device the combination of a box, a translucent screen in the front wall of the box, a projector at the rear wall within the box, and an endless strip of film passing through the projector, said projector comprising a film gear engaging said strip of film continuously, a mutilated gear engaging the film gear intermittently and a motor with a worm drive rotating the mutilated gear continuously, and a plurality of upright rollers receiving the film from the projector and guiding said films in zig-zag formation along the bottom of the box.

In testimony whereof I affix my signature.

HOWARD F. GODEL.